S. P. SURBER.
GAGE OR INDICATOR FOR LIQUID TANKS.
APPLICATION FILED OCT. 31, 1911.
1,024,377.
Patented Apr. 23, 1912.
2 SHEETS—SHEET 2.
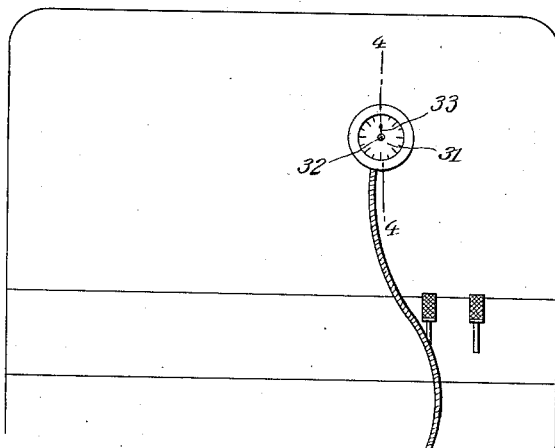
*Fig. 3.*
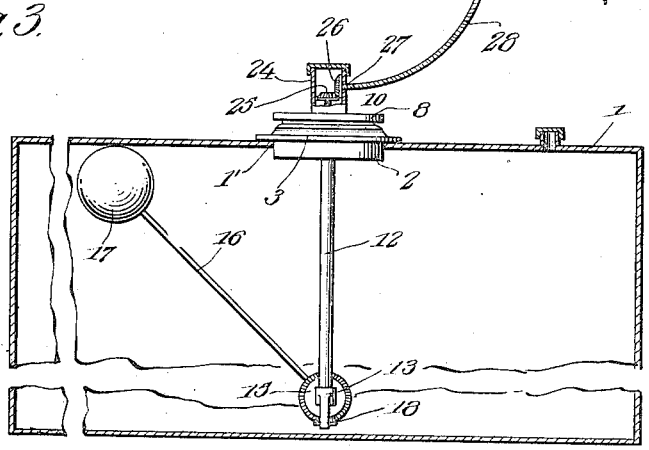
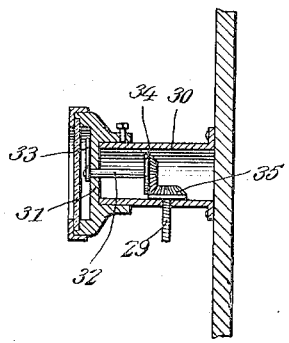
*Fig. 4.*
Witnesses
Inventor
Steven P. Surber,
By Victor J. Evans
Attorney

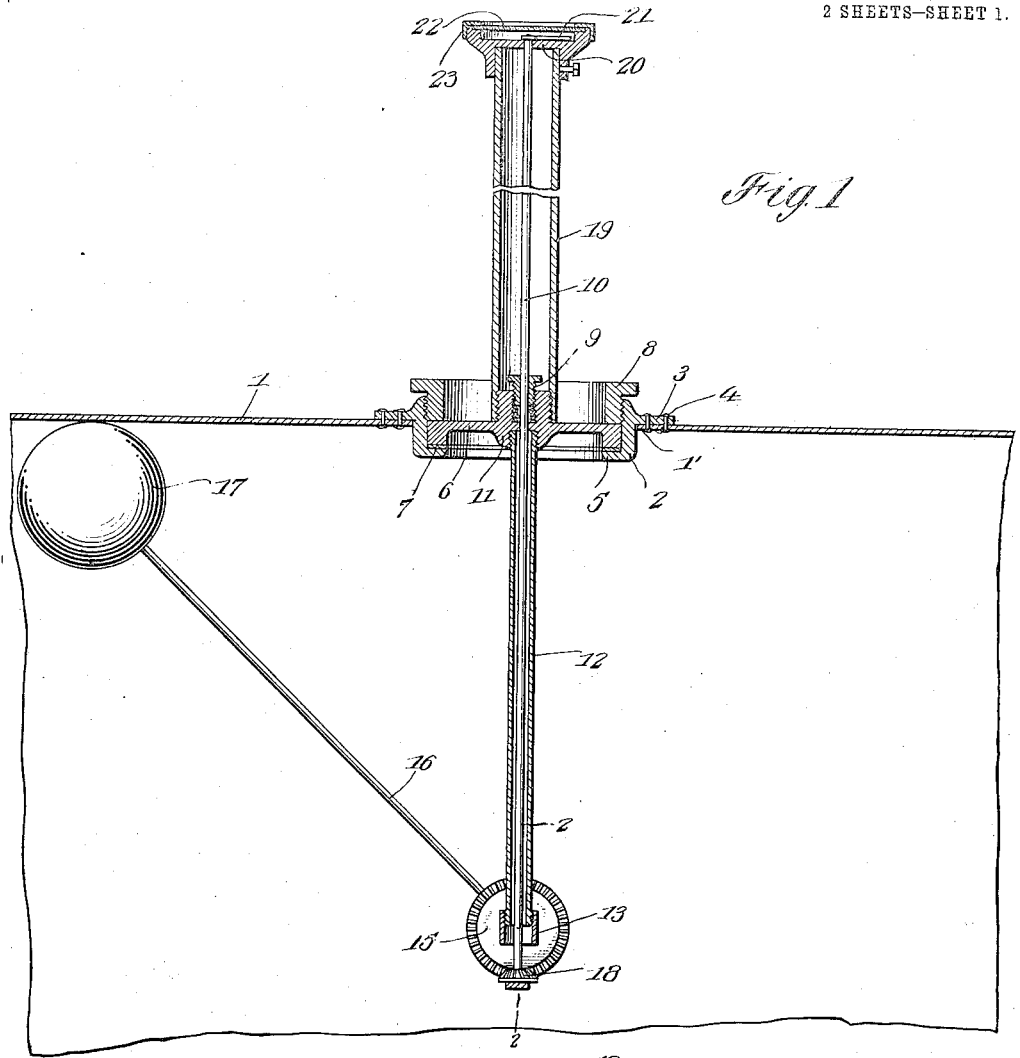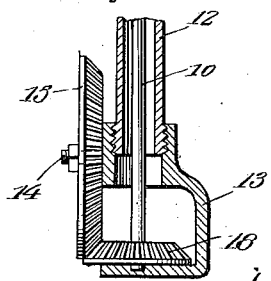

UNITED STATES PATENT OFFICE.

STEVEN P. SURBER, OF SAN ANTONIO, TEXAS.

GAGE OR INDICATOR FOR LIQUID-TANKS.

1,024,377.

Specification of Letters Patent.

Patented Apr. 23, 1912.

Application filed October 31, 1911. Serial No. 657,860.

*To all whom it may concern:*

Be it known that I, STEVEN P. SURBER, a citizen of the United States, residing at San Antonio, in the county of Bexar and State of Texas, have invented new and useful Improvements in Gages or Indicators for Liquid-Tanks, of which the following is a specification.

This invention relates to gages or indicators for liquid tanks, and it has particular reference to an improved gage or indicating device to be used in connection with tanks containing gasolene and like inflammable and explosive liquids.

The invention which may be applied either to underground tanks, to receptacles used in stores and the like, to the gasolene tanks of automobiles and motor vehicles and to other purposes, has for its prime object to present a construction whereby leakage shall be absolutely prevented, thereby minimizing danger from fire.

A further object of the invention is to produce a device of the character set forth which shall accurately indicate the contents of the receptacle in connection with which it is used and which may be easily and conveniently read.

Further objects of the invention are to simplify and improve the general construction and operation of a device of the character set forth.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a sectional elevation showing one form of the invention applied to an underground tank. Fig. 2 is a sectional detail view taken on the line 2—2 in Fig. 1. Fig. 3 is a sectional elevation showing the invention applied to the gasolene tank of an automobile, said view showing also, in elevation, the front board or dash board upon which the indicating dial is mounted. Fig. 4 is an enlarged sectional detail view taken on the line 4—4 in Fig. 3.

Corresponding parts in the several figures are denoted by like characters of reference.

In the several forms of the invention, the top of the tank 1 is provided with an opening 1' reinforced by a casting 2 having an outwardly extending flange 3 for the passage of bolts or rivets 4 whereby it is secured in position, said casting being also provided with an inwardly extending circumferential flange 5 affording a seat for a diaphragm 6 which rests upon a washer or gasket 7, said diaphragm being secured in position by means of a ring 8 having threaded engagement with the casting 2 in such a manner as to form an absolutely tight joint. The diaphragm is provided with a stuffing box 9 through which a substantially vertical shaft 10 extends. The diaphragm is also provided with a downwardly extended threaded collar 11 with which is associated a downwardly extending tube 12 surrounding the lower end of the shaft 10. The lower end of the tube 12 is threaded for the reception of a bracket 13 having a stub shaft 14 upon which a bevel gear 15 is supported for rotation, said bevel gear being provided with a radially extending arm 16 carrying a float 17. The bracket 13 also constitutes a bearing for the lower end of the shaft 10 which latter carries a bevel pinion 18 meshing with the gear 15. It will be seen that as the float 17 rises or falls with the contents of the tank, the shaft 10 will be rotated, the bevel gear and pinion being properly proportioned so as to enable the shaft to make an approximately complete revolution when the float travels between the upper and lower limits of its movement.

Under the construction of the device, as shown in Figs. 1 and 2, the stuffing box 9 is exteriorly threaded for the reception of a tube 19 which extends upward above the top of the ground and which carries at its upper end a dial 20 through which the upper end of the shaft 10 extends, said shaft being provided with a hand or pointer 21 that moves over the dial. The latter is protected by a cover 22 of glass or other transparent material which may be held securely in position by means of a flanged rim 23 having threaded connection with the dial member. It is evident that when the float rises or falls within the tank according to the state of the contents of the latter, the shaft 10 will be rotated, and the state of the contents will be indicated on the dial.

Under the construction illustrated in Figs. 3 and 4, the stuffing box 9 serves to support a casing 24 having threaded connection therewith, said casing containing intermeshing bevel gears 25, 26, the latter of which is supported upon a shaft 27 which is mounted for rotation in the side of the casing. The bevel gear 25 is mounted upon the upper end of the shaft 10. The shaft 27 is connected by a flexible shaft 28 with a shaft 29 associated with a gage casing 30, which latter may be mounted upon the dash board of an automobile in plain view of the operator. The gage casing 30 contains a dial 31 in which is journaled a shaft 32 carrying a hand or indicator 33, said shaft carrying also a bevel gear 34 meshing with a bevel gear 35 upon the shaft 29. It will be readily seen that by this simple mechanism motion will be transmitted from the shaft 10 within the tank to the indicator carrying shaft 32, thus enabling the state of the contents to be ascertained at a glance.

It is obvious that within the scope of this invention the indicator dial may be arranged and supported in different ways, and that various means may be utilized for the purpose of transmitting motion from the shaft 10 to the shaft carrying the hand or indicator which moves over the dial, and no limitation is intended in this respect.

It will be readily understood that the stuffing box 9 contains packing which will absolutely prevent leakage of the contents of the tank or of vapors rising from the latter. Said stuffing box will not materially interfere with the rotation of the shaft 10 which is actuated by the float, and the device may be depended upon to indicate correctly at all times the exact state of the contents of the tank.

The construction of the improved device is simple, and it has been found to be thoroughly efficient for the purposes for which it is intended.

Under the several forms of the invention, suitable means are obviously to be provided for filling the tank. It will be observed that when the tank is being filled, the tube 12 which extends downwardly from the diaphragm 6 surrounding the shaft 10 will constitute an air chamber in which, as the liquid rises within the tank, the air surrounding the shaft 10 is compressed, forming a cushion between the liquid and the diaphragm through which the shaft extends. The liquid will thus be prevented from reaching the stuffing box and from leaking therethrough.

Having thus described the invention, what is claimed as new, is:—

1. In a device of the character described, a tank having an opening in the top thereof, a diaphragm supported to obstruct said opening and having a stuffing box, a substantially vertical shaft rotating in the stuffing box, a tube associated with the diaphragm and extending downwardly to form an air chamber surrounding the shaft, and a float operatively connected to the shaft by coacting gears.

2. In a device of the character described, a tank having an opening in the top thereof, a diaphragm supported to obstruct said opening and having a stuffing box, a substantially vertical shaft rotating in the stuffing box, a float operatively connected to the shaft by coacting gears, a tube associated with the diaphragm and extending downwardly, said tube constituting an air chamber surrounding the shaft, a dial having an indicator, and means for transmitting motion from the shaft to the indicator.

3. In a device of the character described, a tank having an opening in the top thereof, a diaphragm supported to obstruct said opening and having a stuffing box, a substantially vertical shaft rotating in the stuffing box, a dial, an air chamber surrounding the shaft, an indicator associated with the dial and actuated by the shaft, and a float operatively connected to the shaft by coacting gears.

4. In a device of the character described, a tank having an opening in the top thereof, an annular casting secured adjacent to said opening and having an inwardly extending supporting flange, a diaphragm supported on said flange and having a stuffing box, a threaded ring engaging the annular casting to retain the diaphragm in position, a substantially vertical shaft rotating in the stuffing box, a downwardly extending tube connected with the diaphragm and constituting an air chamber surrounding the shaft, a bracket mounted upon the lower end of the tube, said bracket affording a bearing for the lower end of the shaft, a bevel gear supported for rotation upon the bracket and having a float carrying arm secured thereto, and a pinion on the shaft meshing with said bevel gear.

5. In a device of the character described, a diaphragm having a stuffing box, a shaft rotating therein, a downwardly extending tube connected with the diaphragm and constituting an air chamber surrounding the shaft, a bracket mounted upon the lower end of the tube, said bracket affording a bearing for the lower end of the shaft, a bevel gear supported for rotation upon the bracket and having a float carrying arm, a pinion upon the shaft meshing with said bevel gear, a tube extending upwardly from the diaphragm, a dial supported at the upper end of the tube, and a hand connected with the shaft and movable over the dial.

In testimony whereof I affix my signature in presence of two witnesses.

STEVEN P. SURBER.

Witnesses:
I. MOLANDER,
GEO. B. JOHNSTON.